US012756169B2

(12) United States Patent
Wall, II et al.

(10) Patent No.: US 12,756,169 B2
(45) Date of Patent: Oct. 6, 2026

(54) SYSTEMS AND METHODS FOR HIGH-TEMPERATURE ELECTRIC FEEDTHROUGHS HAVING BEADED METALLIC GASKETS

(71) Applicant: First Ammonia Motors, Inc., Concord, NC (US)

(72) Inventors: James L. Wall, II, Concord, NC (US); David Gwynn Kapp, Jr., Concord, NC (US); James Francis Lamb, Concord, NC (US)

(73) Assignee: First Ammonia Motors, Inc., Concord, NC (US)

( * ) Notice: Subject to any disclaimer, the term of this patent is extended or adjusted under 35 U.S.C. 154(b) by 0 days.

(21) Appl. No.: 19/547,462

(22) Filed: Feb. 23, 2026

(65) Prior Publication Data

US 2026/0204884 A1 Jul. 16, 2026

Related U.S. Application Data

(63) Continuation-in-part of application No. 18/817,417, filed on Aug. 28, 2024, which is a continuation of
(Continued)

(51) Int. Cl.
*H02G 3/22* (2006.01)
*H02G 15/013* (2006.01)

(52) U.S. Cl.
CPC ............. *H02G 3/22* (2013.01); *H02G 15/013* (2013.01)

(58) Field of Classification Search
CPC .. H02G 3/22; H02G 3/24; H02G 3/26; H02G 3/30; H02G 3/34; H02G 15/025;
(Continued)

(56) References Cited

U.S. PATENT DOCUMENTS 3,055,972 A 9/1962 Peterson
4,611,093 A 9/1986 Farmer
(Continued)

OTHER PUBLICATIONS

Conax Technologies, High Performance Electrode Seal Fitting, Online: https://www.conaxtechnologies.com/wp-content/themes/conax/pdf/6068.pdf, Published Nov. 2020.
(Continued)

*Primary Examiner* — Angel R Estrada

(57) ABSTRACT

The present invention relates, in general, to an electric feedthrough for conducting electric current in a high-temperature, high-pressure, and corrosive environment includes a pass-thru stud having a seat between threaded distal ends, a ceramic washer disposed adjacent the seat, and a body threadedly coupled to a plug on the pass-thru stud. A first metallic beaded gasket is disposed on a first axial side of the ceramic washer and a second metallic beaded gasket is disposed on a second axial side of the ceramic washer. Each beaded gasket includes an annular metallic body having a circumferential bead projecting axially from the body. The circumferential bead deforms under axial compression to form a sealing interface and provides elastic compliance during thermal cycling. The beaded gaskets may be formed from a nickel-based superalloy to maintain sealing integrity in environments containing heated ammonia and hydrogen.

20 Claims, 8 Drawing Sheets

Related U.S. Application Data application No. 18/638,269, filed on Apr. 17, 2024, now Pat. No. 12,107,407, which is a continuation-in-part of application No. 18/388,296, filed on Nov. 9, 2023, now Pat. No. 12,009,650.

(58) Field of Classification Search

CPC .. H02G 15/013; F16L 5/10; F16L 5/00; F16L 5/02; H01B 17/26; H01B 17/00; H01B 17/005; H01B 17/265; A61N 1/375; A61N 1/3754; A61N 1/3756; A61N 1/3758

USPC ... 174/650, 520, 652, 656, 260, 262, 138 R, 174/77 R, 655; 361/302, 306.1, 600, 601; 333/182; 277/590, 602, 621, 620

See application file for complete search history.

(56) References Cited

U.S. PATENT DOCUMENTS

| | | | |
|---|---|---|---|
| 4,791,247 | A | 12/1988 | Cacalloro |
| 4,820,370 | A | 4/1989 | Ellenberger |
| 4,982,055 | A | 1/1991 | Pollack |
| 5,867,361 | A | 2/1999 | Wolf |
| 7,772,506 | B2 | 8/2010 | Suter et al. |
| 8,084,698 | B2 | 12/2011 | Belton et al. |
| 8,367,935 | B2 | 2/2013 | Bernauer et al. |
| 8,783,693 | B2 | 7/2014 | Beele |
| 8,901,440 | B2 | 12/2014 | Rousseau |
| 9,413,152 | B2 | 8/2016 | Fritz et al. |
| 9,577,416 | B2 | 2/2017 | Nisslbeck et al. |
| 12,009,650 | B1 | 6/2024 | Wall, II |
| 12,102,990 | B1 * | 10/2024 | Wall, II .................. C01B 3/047 |
| 2003/0234115 | A1 | 12/2003 | Deng et al. |

OTHER PUBLICATIONS

Ceramtec, Advanced Ceramic-to-Metal & Glass-Ceramic Sealing Technology, Online: https://www.ceramtec-group.com/, Accessed Nov. 1, 2023.

* cited by examiner

SYSTEMS AND METHODS FOR HIGH-TEMPERATURE ELECTRIC FEEDTHROUGHS HAVING BEADED METALLIC GASKETS

CROSS REFERENCE TO RELATED APPLICATIONS

This application is a continuation-in-part of U.S. Non-Provisional patent application Ser. No. 18/817,417 entitled "APPARATUS FOR AN ELECTRIC FEEDTHROUGH ASSEMBLY WITH VARYING CHARACTERISTICS BASED ON ELECTRIC RATING REQUIREMENTS" filed on Aug. 28, 2024, which is a continuation-in-part of U.S. Pat. No. 12,107,407 entitled "APPARATUS FOR AN ELECTRIC FEEDTHROUGH ASSEMBLY WITH VARYING CHARACTERISTICS BASED ON ELECTRIC RATING REQUIREMENTS" issued on Oct. 1, 2024, which is a continuation-in-part of U.S. Pat. No. 12,009,650 entitled "APPARATUS FOR AN ELECTRIC FEEDTHROUGH FOR HIGH TEMPERATURE, HIGH PRESSURE, AND HIGHLY CORROSIVE ENVIRONMENTS" issued on Jun. 11, 2024, all of which are commonly owned, the disclosure of each is incorporated herein by reference in their entireties.

BACKGROUND

Field of the Invention

The present invention relates, in general, to an apparatus for an electrical power feedthrough suitable for use in high temperature, high pressure, and/or corrosive environments, such as, for example, within ammonia cracking (i.e., dissociation) systems.

Description of Related Art

Electric powered catalyst units, also referred to as catalytic converters, are well known in the prior art. These catalyst units generally have a metallic conductor, through which a current is passed, and which is connected to a voltage source via an electrical contact. Since these catalyst units are designed to be gas-tight, special electric feedthroughs are needed to carry electric current through the housing of the catalyst unit in order to provide electric power to components within the catalyst unit.

Such electric feedthroughs typically consist of an current conductor, which are embedded in an insulating, non-conductive material, such as ceramic. The insulating material can in turn be surrounded by a metal sleeve, which through a variety of known techniques, can be connected to the housing of the catalyst unit in a manner that mitigates mechanical stress. The electric feedthroughs, as known in the prior art, usually have a central current conductor, for example a stud, pin, or bolt, an insulating material surrounding the conductor, and an outer metal sleeve.

A disadvantage of known electric feedthroughs is that they are susceptible to failure in environments where the temperature (i.e., thermal load) and/or pressure is too high. Operation in such environments can lead to damage, degradation, and ultimate failure of these known electric feedthrough devices. Furthermore, in high vibration environments, such as in a vehicle with an internal combustion engine, electric feedthroughs are subject to significant mechanical stress which can also lead to failure. Known electric feedthroughs are not typically rated for use in environments having a temperature above 600° C.

In addition, known electric feedthroughs are subject to failure when used in corrosive environments, such as those with heated ammonia, hydrogen, and nitrogen, for example. Heated ammonia is known to be especially corrosive, and is characterized by its ability to attack and damage many materials, including steel, stainless steel, copper, brass, aluminum, rubbers, and plastics. Heated ammonia is more corrosive than mere gaseous ammonia as heating ammonia causes it to evaporate and form a high concentration of ammonia gas in a confined space, such as within a pressurized electric catalyst unit housing. This high concentration of ammonia gas results in a rapid and extreme chemical attack on metal surfaces, thereby damaging components of the electric feedthrough assemblies that come into contact the ammonia gas.

Similarly, metals exposed to hydrogen at high temperatures can experience internal decarburization and weakening, which can lead to blistering, cracking, and loss of tensile ductility, all of which can ultimately result in a failure of the electric feedthrough.

Furthermore, when known electric feedthroughs are exposed to high temperatures which are significantly higher than those at which its components were assembled, these components expand by different amounts due to differences in coefficient of thermal expansion. If not properly managed, the different rates of expansion for these components, typically made from different materials, can induce stress within the electric feedthrough assemblies, oftentimes leading to device failure and/or the seals at the housing through which the electric feedthroughs are inserted.

Therefore, there is a need for an electric feedthrough assembly that can be used to supply power to an electric catalyst unit on-board a vehicle having an internal combustion, and which addresses the aforementioned challenges and drawbacks of known electric feedthroughs which are subject to failure during operation in high temperature, high pressure, and/or highly corrosive environments.

SUMMARY

In an embodiment, the present invention is directed to an electric feedthrough for conducting electric currents in a high temperature, high pressure, and corrosive environment, comprising: a pass-thru stud having a seat between first and second threaded distal ends; a ceramic washer disposed adjacent a first face of the seat; a plug disposed on the pass-thru stud, the plug having a threaded portion; a body threadedly coupled to the threaded portion of the plug; and a first metallic beaded gasket disposed on a first axial side of the ceramic washer and a second metallic beaded gasket disposed on a second axial side of the ceramic washer, wherein each metallic beaded gasket comprises: an annular metallic body; and a circumferential bead projecting axially from the annular metallic body, wherein the circumferential bead is configured to: (i) plastically deform during initial tightening of the electric feedthrough, and (ii) elastically deflect during subsequent thermal expansion and contraction cycles so as to maintain axial preload and thereby distribute axial load across the ceramic washer.

In another embodiment, the present invention is directed to a sealing subassembly for isolating a ceramic electrical insulator from compressive stress within a high-temperature feedthrough, comprising: a ceramic washer; a first annular metallic gasket disposed on a first axial side of the ceramic washer; a second annular metallic gasket disposed on a second axial side of the ceramic washer; wherein each annular metallic gasket includes a circumferentially continuous axially projecting bead configured to: (a) concentrate compressive load along a narrow sealing band, and (b) provide elastic compliance during thermal cycling, thereby distributing axial loading across the ceramic washer and reducing fracture risk.

In yet another embodiment, the present invention is directed to a method of maintaining sealing preload in an electric feedthrough exposed to repeated thermal cycling above 600° C., comprising: positioning a ceramic washer on a pass-thru stud; disposing a first beaded metallic gasket on a first axial side of the ceramic washer; disposing a second beaded metallic gasket on a second axial side of the ceramic washer; and applying axial compression such that circumferential beads of the beaded metallic gaskets plastically deform to establish a sealing interface and subsequently elastically deflect during thermal expansion and contraction to maintain axial preload.

BRIEF DESCRIPTION OF THE DRAWINGS

These and other embodiments of the present invention will be discussed with reference to the following exemplary and non-limiting illustrations, in which like elements are numbered similarly, and where.

DEFINITIONS

Figure 1:
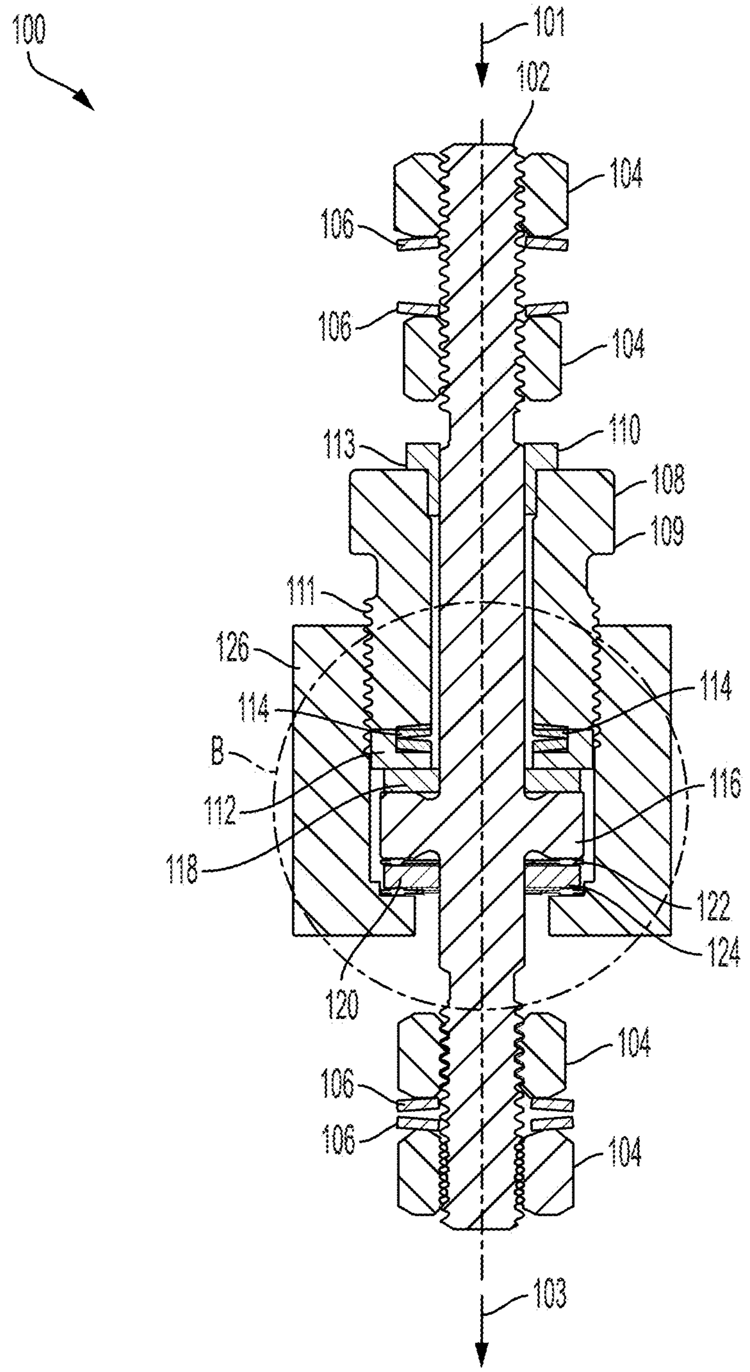
FIG. 1 is a cross-sectional view of an electric feedthrough assembly, according to an embodiment of the present invention.

The following definitions are meant to aid in the description and understanding of the defined terms in the context of the present invention. The definitions are not meant to limit these terms to less than is described throughout this specification. Such definitions are meant to encompass grammatical equivalents.

As used herein, the term "vehicle" refers to any moving vehicle that is capable of carrying one or more human occupants and/or cargo, or which is capable of performing a task, and which is powered by any form of energy. The term "vehicle" includes, but is not limited to: (a) motor vehicles such as cars, trucks, vans, minivans, sport utility vehicles, passenger carrying vehicles, goods carrying vehicles, 2-, 3-, and 4-wheeled vehicles, quadricycles, motorcycles, scooters, all-terrain vehicles, utility task vehicles, and the like; (b) airborne vehicles such as helicopters, airplanes, airships, drones, aerospace vehicles, and the like; (c) marine vessels such as dry cargo ships, liquid cargo ships, specialized cargo ships, tug-boats, cruise ships, recreational boats, fishing boats, personal watercraft, jet skis, and the like; (d) locomotives; and (e) heavy equipment and machinery, power generators, lawnmowers and tractors, agricultural equipment and machinery, forestry equipment and machinery, construction equipment and machinery, mining equipment and machinery, and the like.

As used herein, the term "internal combustion engine" refers to any engine, spark ignition gasoline engine, compression ignition diesel engine, rotary, reciprocating, or other engine wherein combustion takes place in a combustion chamber, such that the products of combustion, together with any other by-products, perform work by exerting force on a moving surface from which the mechanical output is obtained from the engine. The term "internal combustion engine" includes, but is not limited to, hybrid internal combustion engines, two-stroke engines, four-stroke engines, six-stroke engines, and the like.

As used herein, the term "catalyst" refers to a material that promotes a chemical reaction. The term "catalyst" includes, but is not limited to, a catalyst or catalysts capable of promoting cracking reactions, such as ammonia cracking reactions, whether used as base catalyst(s) and/or additive catalyst(s). The catalyst, for the purposes of the present invention, can include, but is not limited to, a non-stoichiometric lithium imide, nickel, iron, cobalt, iron cobalt, ruthenium, vanadium, palladium, rhodium, platinum, sodium amide, and the like, as well as various combinations thereof.

As used herein, the term "cracking" refers to a process or processes by which ammonia is dissociated and/or decomposed into constituent hydrogen and nitrogen components over at least one catalyst.

As used herein, the term "nickel alloy" refers to pure nickel or an alloy containing nickel as a main component. The term "nickel alloy" includes, but is not limited to, Inconel®, such as, for example, Inconel® 625, Inconel® 718, Inconel® 725, and other compound metals having nickel as a main component. Inconel® is the trademark of Special Metals Corporation of Huntington, West Virginia, and is an alloy of nickel containing chromium and iron, and which is resistant to corrosion at high temperatures.

As used herein, the term "ceramic" refers to silicon nitride ceramic, steatite, and other non-conductive ceramic materials.

As used herein, the terms "seal", "sealed", and "sealing" refer to protection from harmful effects of ambient environmental conditions. Such protection includes protection against differences in pressure, temperature, fluid/humidity, electrical potential, shock, and gaseous compositions. These terms also refer to a hermetic, vacuum, air-tight, and/or gas-tight environment within a housing, such as within a pressure vessel.

As used herein, the term "pressure vessel" refers to a closed housing or container designed to hold gases or liquids at a pressure substantially higher or lower than the ambient pressure, such as, for example, compressed gas cylinders, compressors, vacuum chambers, autoclaves, hermetically sealed enclosures, and the like.

DETAILED DESCRIPTION

It should be understood that aspects of the present invention are described herein with reference to the figures, which show illustrative embodiments. The illustrative embodiments herein are not necessarily intended to show all embodiments in accordance with the invention, but rather are used to describe a few illustrative embodiments. Thus, aspects of the invention are not intended to be construed narrowly in view of the illustrative embodiments. In addition, although the present invention is described with respect to its application for an electric catalyst unit utilized on-board a motor vehicle, it is understood that the electric feedthrough assembly of the present invention can be implemented in any high pressure, high temperature, and/or corrosive setting where electricity needs to be supplied into a sealed environment. Such applications of the present invention include, but are not limited to, downhole, well-bore, sub-sea, medical device, aeronautics, extraterrestrial, nuclear power, mining, and industrial fabrication (i.e., vacuum furnaces, sample heating, in-vacuum coating, electron beam evaporation, plasma sputtering, etc.) technologies.

FIG. 1 is a cross-sectional view of an electric feedthrough assembly 100, according to an embodiment of the present invention. The electric feedthrough 100 comprises a pass-thru stud 102, which conducts electricity between an external power source 101 and a power consuming device 103 located within a sealed environment.

In an embodiment, the pass-thru stud 102 has a high electrical rating and a low resistance due to its relatively large cross-sectional contact area. The pass-thru stud 102 is made from a highly conductive material, such as, but not limited to, Inconel®, copper, iron, gold, aluminum, silver, and combinations thereof.

In an embodiment, each distal end of the pass-thru stud 102 has a threaded surface, where each distal end accepts complimentary threaded nuts 104, which are preferably in the form of hexagonal ("hex") nuts. In another embodiment, the threaded nuts 104 are in the form of square nuts or round nuts. A pair of threaded nuts 104 are secured to each respective distal end of the pass-thru stud 102 as shown in FIG. 1. In an embodiment, the threaded nuts 104 are made from a nickel alloy, and in a preferred embodiment, the threaded nuts 104 are made from Inconel®.

Between each pair of threaded nuts 104, opposing washers 106 are secured to each respective threaded distal end of the pass-thru stud 102. In an embodiment, the washers 106 are made from a nickel alloy. In a preferred embodiment, the washers 106 are made from a nickel alloy, and in a preferred embodiment, the washers 106 are made from Inconel®.

Each pair of threaded nuts 104 and opposing washer 106 assembly secures a respective end of a conductor between respective opposing washers 106. For example, one pair of opposing washers 106 can secure an end of a conductor that supplies current from an external voltage source, while the other pair of opposing washers 106 can secure an end of a conductor used to deliver the current to an application, such as a heating element.

A plug 108 is disposed between the respective pair of threaded nuts 104, as shown in FIG. 1. In an embodiment, the plug 108 is a unified extra fine thread ("UNEF") plug with a diameter of 0.875 inches. The plug 108 has a counterbore flange 109 and a threaded portion 111.

An electrical insulating sleeve 110 is disposed within an aperture 113 on the plug 108. In an embodiment, the sleeve 110 is made from a ceramic material that is non-conductive and has electrically insulative properties, and which has high mechanical strength that provides wear resistance, and which is resistant to corrosion at high temperatures.

A counterbore washer 112 is disposed adjacent to the threaded portion 111 of the plug 108. The counterbore washer 112 includes a recessed seat. In an embodiment, the counterbore washer 112 is from a nickel alloy, and in a preferred embodiment, the counterbore washer 112 is made from Inconel®.

At least two washers 114 are received by, and sit within, the recessed seat of the counterbore washer 112. In an embodiment, the washers 114 are made from a nickel alloy. In a preferred embodiment, the washers 114 are made from Inconel®.

The present invention improves over known prior art electric feedthroughs as the materials utilized for the various components are selected due to their increased temperature, pressure, and corrosion resistance properties. Specifically, the washers 106 and 114 are preferably made from Inconel®. Inconel® has a melting point of 1390 to 1425° C., which is significantly higher than the melting points of zinc (420° C.), aluminum (660° C.), brass (930° C.), copper (1084° C.). The aforementioned metals are typically utilized in known electric feedthroughs.

In other embodiments, the washers 106, 114 are made from carbon steel, stainless steel, molybdenum, titanium, cobalt, iridium, and/or tungsten, all of which have high melting points.

Disposed on a side of the counterbore washer 112 opposite the plug 108 is a ceramic washer 118. The ceramic washer 118 is a non-conductive electrical insulator. In an embodiment, the ceramic washer 118 is made from silicon nitride. In another embodiment, the ceramic washer 118 is made from a material which is non-conductive and have electrically insulative properties.

Disposed on a side of a seat 116 opposite the counterbore washer 112 and plug 108 is another ceramic washer 120 surrounded by a silver washers 122, 124, each of which has raised sealing rings on both sides. In an embodiment, the silver washers 122, 124 each have the same properties and dimensions. In another embodiment, the silver washers 122, 124 have different properties and dimensions, such as, for example, different internal diameters, thicknesses, heights of the raised sealing ring wall.

In an embodiment, each of the components of the electric feedthrough assembly 100, including the pass-thru stud 102, threaded nuts 104, plug 108, sleeve 110, and washers 106, 112, 114, 122, 124 can be selected based on current and/or voltage requirements of the specific end-use or application of the electric feedthrough assembly 100. For example, for a high electric rating (i.e., high current and/or high voltage) application, a pass-thru stud 102 having a larger cross-sectional area can be utilized, whereas for a low electric rating (i.e., low current and/or low voltage) application, a pass-thru stud 102 having a smaller cross-sectional area can be utilized.

In an embodiment, the electric feedthrough assembly 100 is modular, such that specific dimensioned/sized components can interchangeably be utilized. For example, in the example provided above, a pass-thru stud having a larger cross-sectional area can be replaced with a pass-thru stud having a smaller cross-sectional area if the end-use or application requires a low electric rating. Multiple, separate electric feedthrough assemblies are thus not required for various end-uses having different electric ratings, and different dimensioned/sized components could be utilized in the electric feedthrough assembly 100 as required.

A body 126 is disposed such that it surrounds a majority of the threaded portion 111 of the plug 108, as well as the counterbore washer 112, washers 114, seat 116, ceramic washers 118, 120, and silver washers 122, 124.

Figure 2:
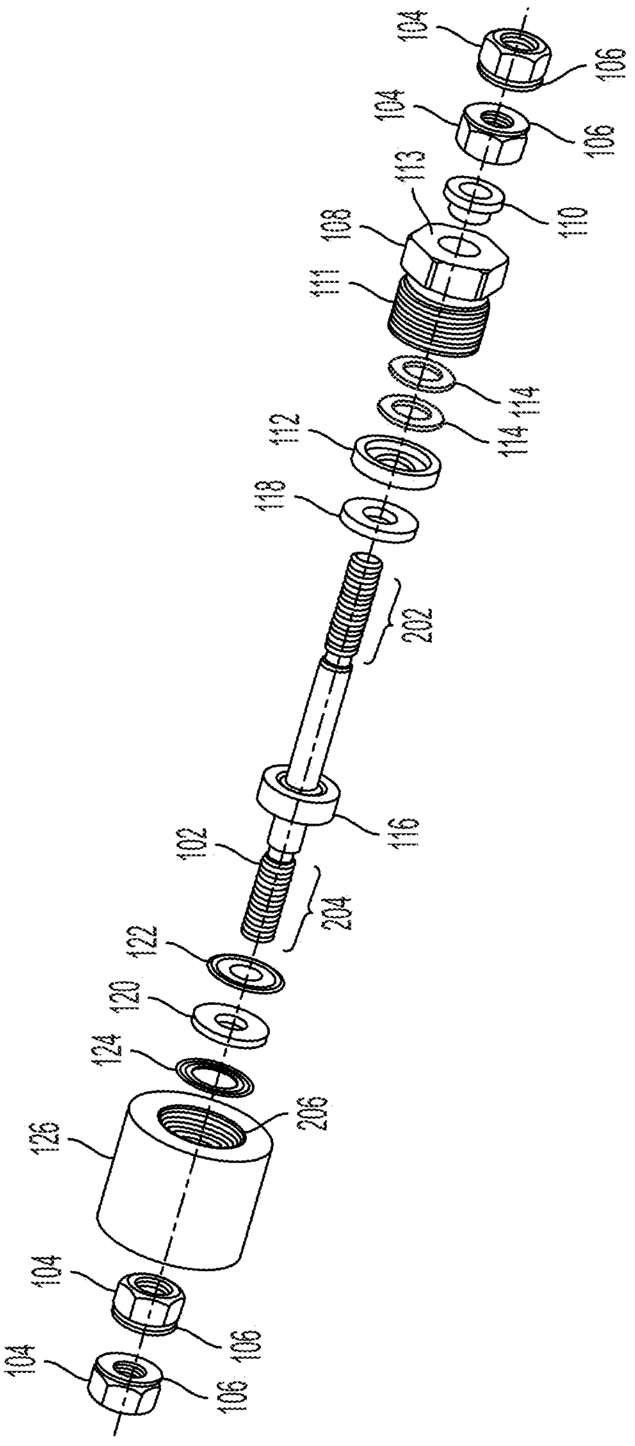
FIG. 2 is an exploded view of the electric feedthrough assembly, according to an embodiment of the present invention.

FIG. 2 is an exploded view of the electric feedthrough assembly 100, according to an embodiment of the present invention. As can be seen in FIG. 2, the pass-thru stud 102 has threaded distal ends 202, 204, and the body 126 has a threaded internal surface 206.

Figure 3:
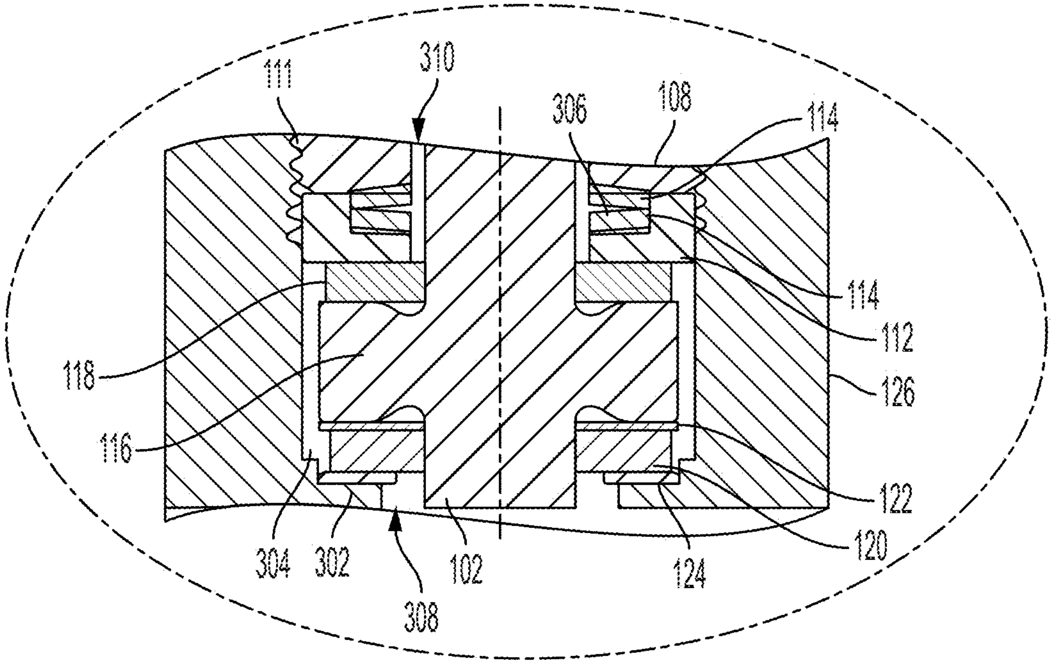
FIG. 3 is a cross-sectional view of a seat of a pass-thru stud of the electric feedthrough assembly, according to an embodiment of the present invention.

FIG. 3 is a cross-sectional view of the seat 116 of the pass-thru stud 102 of the electric feedthrough assembly 100, according to an embodiment of the present invention. As can be seen in FIG. 3, the body 126 further includes a flange 302 on which the ceramic washer 120 and silver washers 122, 124 are disposed on, and which provide a sealing portion between the gap 304 and opening 308. On an opposite side of the seat 116 of the pass-thru stud 102 from the flange 302, the plug 108, counterbore washer 112, washers 114, and ceramic washer 118 provide a sealing portion between the gap 304 and opening 310.

In addition, the washers 114 are disposed within the counterbore washer 112 in such a manner that a compressible void 306 is created between the washers 114.

In another embodiment, the washers 122, 124 can be made from vermiculite, such as, for example, Thermiculite®, a high-temperature, sealing material comprised of chemically exfoliated and thermally exfoliated vermiculite. Thermiculite® is a trademark of Flexitallic Group of Houston, Texas. The use of vermiculite for the washers 122, 124 can be beneficial in a higher temperature-rated environments of up to 1,000° C., which is above the melting point of silver at approximately 960° C.

Figure 4:
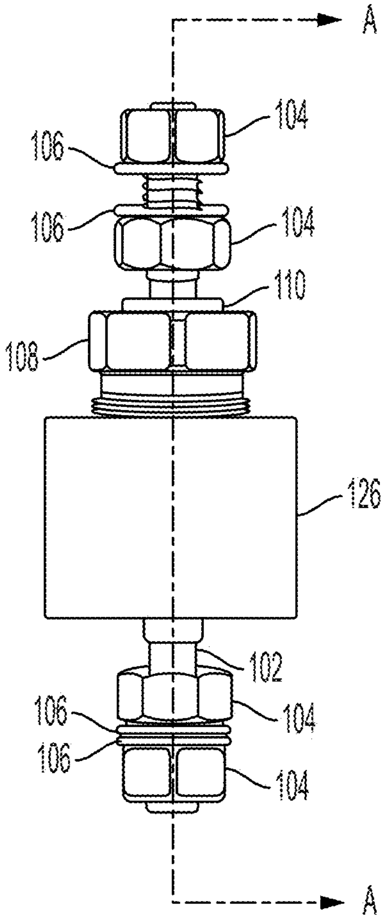
FIG. 4 is a perspective view of the electric feedthrough assembly, according to an embodiment of the present invention.

FIG. 4 is a perspective view of the electric feedthrough assembly 100, according to an embodiment of the present invention.

Figure 5:
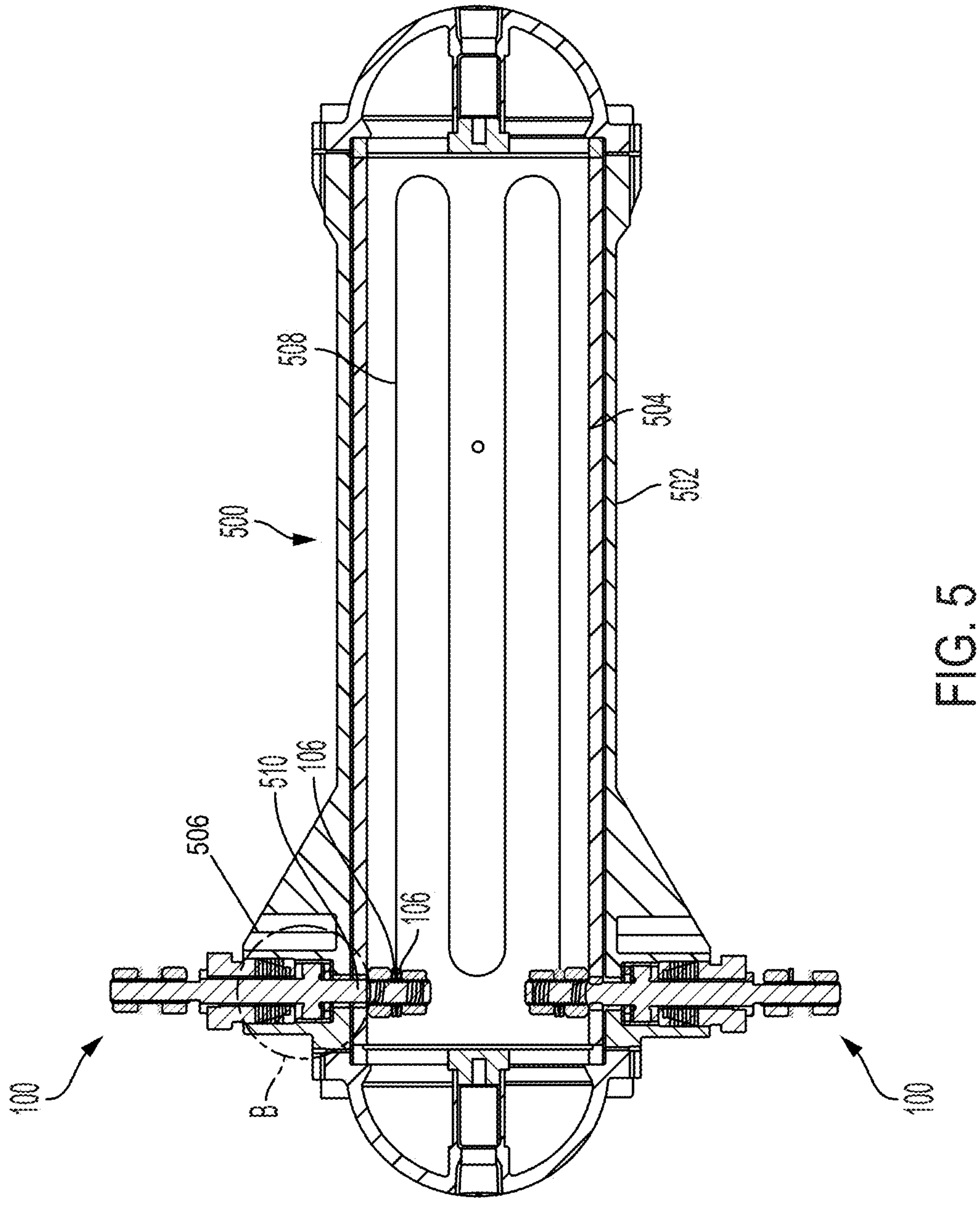
FIG. 5 is a cross-sectional view of an electric catalyst unit incorporating electric feedthrough assemblies, according to an embodiment of the present invention.

FIG. 5 is a cross-sectional view of an electric catalyst unit 500 incorporating electric feedthrough assemblies 100, according to an embodiment of the present invention. The electric catalyst unit 500 is described in commonly owned U.S. patent application Ser. No. 18/241,328 filed on Sep. 1, 2023, entitled "SYSTEMS AND METHODS FOR THE CATALYTIC PRODUCTION OF HYDROGEN FROM AMMONIA ON-BOARD MOTOR VEHICLES", which is incorporated by reference herein.

The electric catalyst unit 500 includes a housing 502, as well as a sleeve 504, such as a ceramic insulating sleeve, all of which form a pressure vessel. The housing 502 further includes fittings 506 which are configured to receive respective electric feedthrough assemblies 100. The fittings 506 form respective apertures 510 in which the electric feedthrough assemblies 100 can be guided into the interior of the electric catalyst unit 500.

In an embodiment, each electric feedthrough assembly 100 is coupled to its respective fitting 506 in a manner resistant to mechanical stress. The coupling can be made via welding or bolting the electric feedthrough assembly 100 to the fitting 506 in a permanent, or semi-permanent manner. This design allows the electric feedthrough assembly 100 to be connected to various housings for a variety of end-uses or applications.

In another embodiment, the electric feedthrough can be removably coupled to the fitting 506, such that different electric feedthroughs can be interchangeably utilized with the fitting 506. In this embodiment, the coupling can be made via a press-fit, mechanical interlocking, or other similar mechanism which allows the electric feedthrough assembly 100 to seal the aperture 510 upon installation, but which also allows the electric feedthrough assembly 100 to be removed from the fitting 510.

A conductor, such as a heating element 508, is disposed within the electric catalyst unit 500. The heating element 508 can be an air process heater, a cartridge heater, a tubular heater, a band heater, a strip heater, an etched foil heater (or a thin-film heater), a ceramic heater, a ceramic fiber heater, a resistance wire, and the like. Respective ends of the heating element 508 are in contact with the electric feedthrough assemblies 100, as shown in FIG. 5. The electric feedthrough assemblies 100 provide electricity from the external power source 101 for energizing or heating the heating element 508.

In an embodiment, each electric feedthrough assembly 100 secures a respective end of the heating element 508 between opposing washers 106. In another embodiment, the respective ends of the heating element 508 are secured in contact with the electric power-feed through 100 through a variety of means, including, but not limited to, welding, clamping, clinching, folding, wrapping, and the like.

The electric catalyst unit 500 includes a catalyst, such as discrete catalyst media, disposed within its interior. In another embodiment, the catalyst can be coated on the interior walls and surfaces of the electric catalyst unit 500, and/or onto the surfaces of the heating element 508, using a washcoating or deposition technique to bind or adhere the catalyst to these surfaces.

In an embodiment, the electric catalyst unit 500 receives gaseous ammonia from a heat-exchange catalyst unit (not shown). Electrical current from the external power source 101 is passed to the heating element 508 via the electric feedthrough assemblies 100, thereby energizing and heating the heating element 508 to a threshold temperature suitable to heat the catalyst and thereby perform the ammonia cracking process. The threshold temperature can range from 400° C. to 700° C., and in a preferred embodiment, the threshold temperature is at least 600° C.

Figure 6:
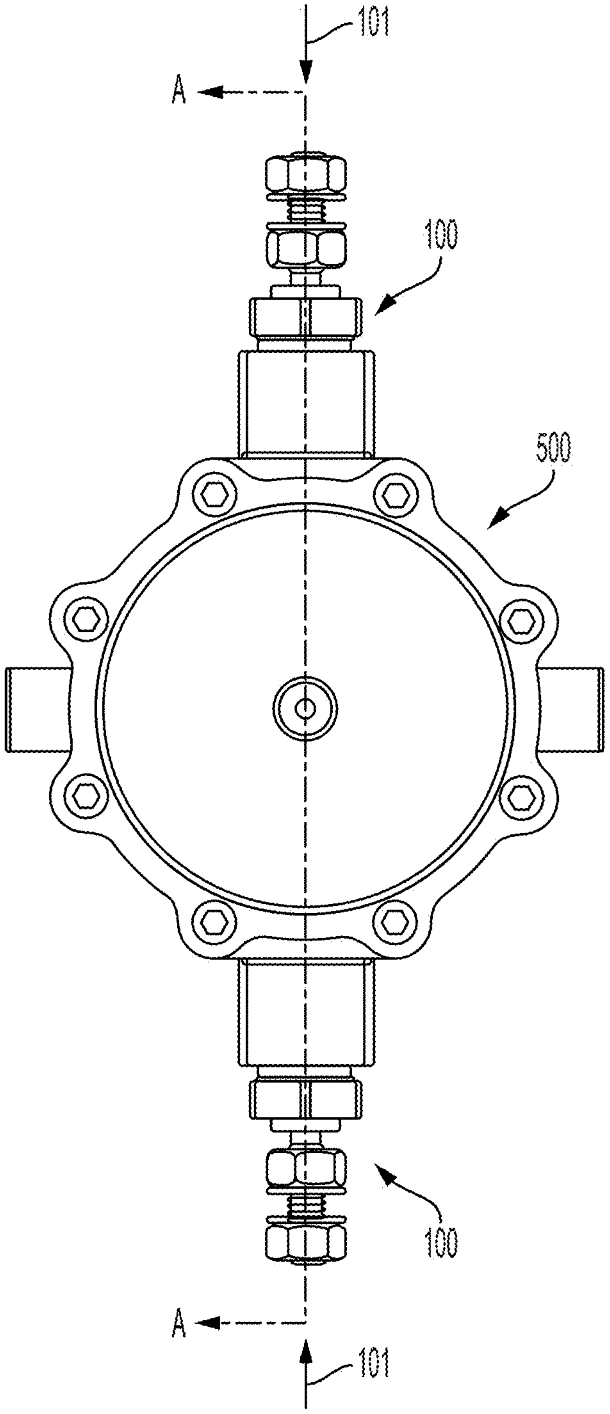
FIG. 6 is a perspective view of the electric catalyst unit incorporating electric feedthrough assemblies, according to an embodiment of the present invention.

FIG. 6 is a perspective view of the electric catalyst unit 500 incorporating electric feedthrough assemblies 100, according to an embodiment of the present invention. In an embodiment, two electric feedthrough assemblies 100 are utilized. However, the present invention is not limited to the depicted construction, and multiple electric feedthrough assemblies 100 can be utilized based on the required power capacity for the heating element.

Figure 7:
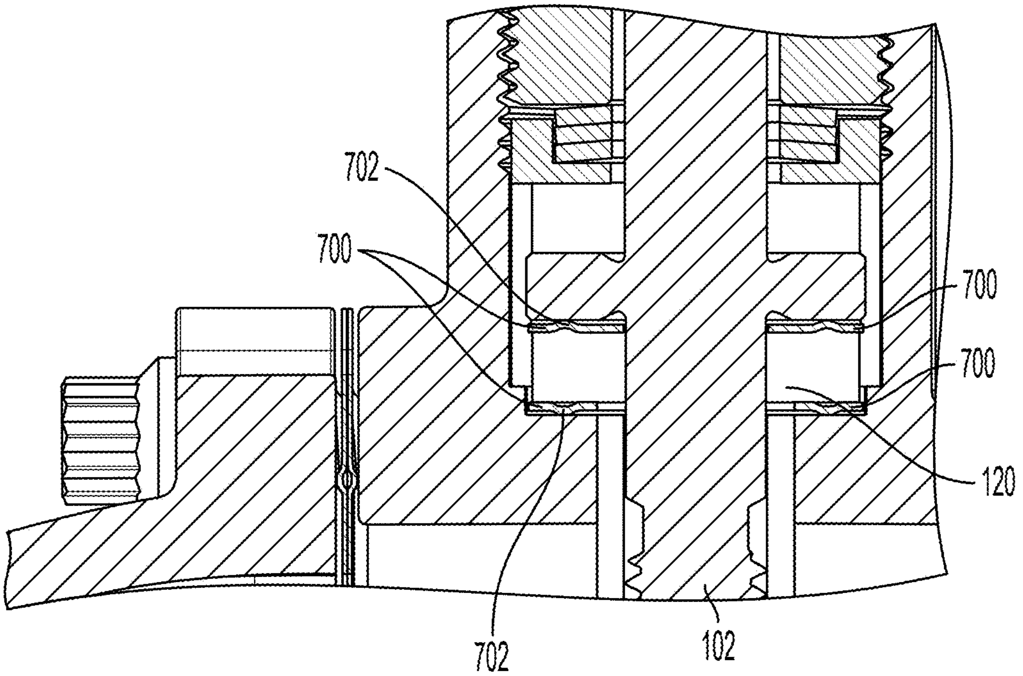
FIG. 7 is a cross-sectional view of a seat of a pass-thru stud of the electric feedthrough assembly having beaded gaskets, according to an embodiment of the present invention.

FIG. 7 is a cross-sectional view of a seat 116 of a pass-thru stud 102 of the electric feedthrough assembly having beaded gaskets 700, according to an embodiment of the present invention. In this embodiment, a beaded gasket 700 replaces the pair of silver washers 122, 124 shown and described with respect to FIG. 3. The beaded gasket 700 is preferably disposed on each axial side of the ceramic washer 120, such that the ceramic washer 120 is positioned between opposing beaded gaskets 700. Each beaded gasket 700 includes at least one circumferentially extending beaded portion 702.

In an embodiment, the beaded portion 702 of the beaded gasket 700 is configured to provide a concentrated sealing interface between adjacent components of the electric feedthrough assembly. The beaded portion 702 projects axially from a primary planar body of the gasket 700 and forms a circumferentially continuous raised sealing ridge. Upon axial compression of the electric feedthrough assembly during tightening, the beaded portion 702 engages opposing metallic surfaces and undergoes controlled deformation.

In an embodiment, the beaded portion 702 is dimensioned such that controlled deformation occurs during assembly tightening without overstressing the ceramic washer 120. The beaded portion 702 may have a bead height measured axially from the planar surface of the gasket body 800 of approximately 0.05 mm to 1.0 mm, and more preferably from 0.1 mm to 0.5 mm. The bead width measured radially across the raised sealing ridge may be approximately 0.1 mm to 2.0 mm, and more preferably from 0.25 mm to 1.0 mm.

The gasket body 800 may have a thickness of approximately 0.1 mm to 2.0 mm, and more preferably from 0.25 mm to 1.0 mm. These dimensional relationships allow the bead geometry to plastically conform to adjacent metallic sealing surfaces during initial tightening while retaining sufficient elastic compliance for preload maintenance during subsequent thermal cycling.

In an embodiment, the beaded gasket 700 is configured such that, during tightening of the electric feedthrough assembly, the bead undergoes an initial plastic set to accommodate surface roughness, machining tolerances, and minor misalignment, while the remaining portion of the bead geometry continues to provide resilient spring-like compliance. This combination of plastic conformity and elastic deflection permits the gasket to maintain sealing contact pressure even as the assembly experiences differential thermal expansion between metallic components and the ceramic washer 120.

In an embodiment, the circumferential bead may be formed by stamping or embossing the gasket body 800 using a forming die configured to produce a continuous raised ridge. In other embodiments, the bead may be formed by machining, hydroforming, or other metal-forming processes suitable for nickel-based superalloys. The gasket may optionally be heat-treated after forming to achieve a desired balance of yield strength and elastic recovery.

In an embodiment, the beaded gasket 700 is a single-layer metallic gasket. In other embodiments, the gasket may include multiple layers or multiple concentric beads depending on sealing requirements, provided that at least one circumferential bead projects axially to define a concentrated sealing interface.

In an embodiment, the electric feedthrough assembly is tightened such that an axial compressive preload is applied sufficient to deform the circumferential bead without inducing fracture of the ceramic washer 120. For example, the axial compression may be selected such that the bead experiences localized yielding while the ceramic washer remains primarily under distributed compressive loading rather than point stress concentration.

In an embodiment, opposing beaded gaskets 700 disposed on both axial sides of the ceramic washer 120 cooperate to distribute compressive loading symmetrically across the ceramic washer and to reduce bending or uneven loading that could otherwise contribute to cracking.

In an embodiment, the bead geometry provides a sealing interface capable of maintaining a substantially gas-tight seal under operating pressures of at least 10 bar, at least 50 bar, or at least 100 bar, and at operating temperatures above 600° C., including environments containing ammonia, hydrogen, and nitrogen.

In an embodiment, the circumferential bead engages adjacent metallic sealing surfaces having a surface finish of approximately Ra 0.2 μm to 3.2 μm. The concentrated contact stress generated by the reduced bead contact area enables the gasket to conform to minor surface irregularities, thereby improving hermetic sealing performance.

In an embodiment, the nickel-based superalloy material and bead geometry are selected to resist creep relaxation under sustained compressive loading at elevated temperature. For example, the beaded gasket 700 may maintain sealing preload over extended durations of operation at temperatures above 600° C., thereby reducing the likelihood of seal loss due to stress relaxation.

In an embodiment, the resilient bead structure dampens vibration-induced micro-movement between adjacent components of the feedthrough assembly. This damping effect assists in maintaining consistent sealing pressure in high-vibration environments such as vehicle-mounted ammonia cracking catalyst systems.

In an embodiment, the bead is the only raised sealing feature of the gasket and defines a single continuous sealing ridge concentrically surrounding the pass-thru stud.

Because the beaded portion 702 defines a reduced contact area relative to a flat washer, axial clamping force applied to the assembly is concentrated along the circumferential ridge of the bead. This concentration of force increases localized contact stress at the sealing interface, thereby enhancing sealing performance between adjacent components. The elevated contact stress enables the gasket 700 to conform to minor surface irregularities and machining tolerances, thereby improving hermetic sealing capability under high-pressure conditions.

In an embodiment, the beaded portion 702 further provides elastic compliance during assembly and operation. When compressed, the bead geometry deflects in a manner that permits controlled elastic and/or plastic deformation. This geometry allows the beaded gasket 700 to function as a resilient sealing member that maintains axial preload even in the presence of minor dimensional changes within the assembly. Such dimensional changes may result from thermal expansion differences among the pass-thru stud 102, ceramic washer 120, body 126, and other metallic components.

In high-temperature environments, components of the electric feedthrough assembly may expand at different rates due to differences in coefficients of thermal expansion. The beaded portion 702 accommodates such differential expansion by permitting limited elastic deflection, thereby reducing the likelihood of loss of clamping force during thermal cycling. As a result, sealing integrity may be maintained over repeated heating and cooling cycles.

In an embodiment, the beaded gasket 700 is disposed on each axial side of the ceramic washer 120. The beaded portions 702 provide a compliant interface between metallic components and the ceramic washer 120. Because ceramic materials are generally brittle and sensitive to stress concentrations, the deformable bead geometry distributes axial loads more uniformly across the ceramic interface. This configuration reduces peak stress concentrations that could otherwise contribute to cracking or fracture of the ceramic washer 120.

Additionally, the resilient nature of the beaded portion 702 assists in dampening micro-movements caused by vibration, shock loading, or pressure pulsations. By maintaining consistent contact pressure and accommodating small relative movements between components, the beaded gasket 700 enhances long-term sealing durability in high-vibration environments, such as those encountered in vehicle-mounted catalyst systems.

In certain mechanical sealing applications, such as automotive cylinder head assemblies, multi-layer steel (MLS) gaskets may include embossed sealing beads intended to accommodate flange distortion under clamping loads. Similarly, Belleville washers are known to provide axial spring force in bolted joints. However, such structures are not configured for use within a confined electric feedthrough assembly incorporating a brittle ceramic electrical insulator and operating in a high-temperature, chemically aggressive ammonia dissociation environment.

Multi-layer head gaskets are generally designed for distributed flange sealing between relatively compliant metallic engine components, where large-area clamping loads are applied across multiple fasteners. The embossed features in such gaskets are typically thin-sheet deformations intended to compensate for flange irregularities and combustion pressure pulses. These gaskets are not configured to isolate a ceramic component from axial stress within a compact, concentrically stacked feedthrough structure. Moreover, head gasket embossments are not typically formed from nickel-based superalloys optimized for sustained operation above approximately 600° C. in hydrogen- and ammonia-containing environments. Nor are such gaskets configured to maintain axial preload in a single, centrally clamped stud configuration as required in an electric feedthrough assembly.

Similarly, Belleville washers are generally conical disc springs designed to provide axial spring force in bolted joints. While Belleville washers provide elastic compliance, they are structurally distinct from a circumferentially continuous sealing bead formed integrally within an annular gasket body. A Belleville washer functions primarily as a load spring and does not inherently define a narrow circumferential sealing band configured to plastically conform to adjacent sealing surfaces. Further, Belleville washers are not configured to provide controlled plastic deformation during initial tightening followed by elastic deflection during thermal cycling in order to both establish a hermetic seal and maintain preload in a chemically aggressive environment. The geometry, function, and intended application of a Belleville washer differ fundamentally from the beaded gasket 700, which combines sealing concentration, preload retention, and ceramic stress isolation within a single integrated annular structure.

The beaded gasket 700 is specifically configured for a feedthrough stack in which axial load must be precisely controlled to avoid fracture of a ceramic washer while simultaneously maintaining hermetic sealing under high-temperature thermal cycling and vibration. The beaded portion 702 is dimensioned and formed to concentrate load along a controlled sealing band, to undergo an initial plastic set for surface conformity, and thereafter to provide elastic compliance that accommodates differential thermal expansion between metallic and ceramic components. The combination of (i) nickel-based superalloy material selection, (ii) defined circumferential bead geometry, (iii) dual opposed gasket placement around a ceramic insulator, and (iv) operation within a high-temperature ammonia cracking pressure vessel environment produces a functional integration not achieved by conventional embossed sheet gaskets or Belleville spring washers used in unrelated mechanical joint applications.

Accordingly, while embossed sealing features and spring washers may be known individually in other mechanical contexts, the structural configuration, material selection, and functional cooperation of the beaded Inconel® gasket 700 within the electric feedthrough assembly represent a distinct sealing architecture specifically adapted for high-temperature, high-pressure, and chemically aggressive feedthrough environments involving brittle ceramic electrical insulators.

In an embodiment, the beaded gasket 700 is formed from a nickel alloy, and preferably from Inconel®, such as Inconel® 625, Inconel® 718, Inconel® 725, or other nickel-based superalloys. The selection of Inconel® provides significant advantages in high-temperature, high-pressure, and chemically aggressive environments.

Nickel-based superalloys such as Inconel® retain high mechanical strength at elevated temperatures. Unlike softer metals, which may experience significant creep or loss of preload under sustained compressive stress at high temperature, Inconel® maintains structural integrity and dimensional stability at temperatures well above typical operating temperatures of ammonia cracking systems. As a result, the beaded portion 702 is capable of maintaining sealing force over extended periods of operation without substantial relaxation or deformation that could compromise sealing performance.

In an embodiment, the Inconel® beaded gasket 700 exhibits excellent resistance to creep deformation under sustained compressive loading. This property is particularly advantageous in pressure vessel applications in which the gasket remains under constant axial compression for prolonged durations. By resisting creep, the beaded gasket 700 maintains localized contact stress at the sealing interface, thereby preserving hermetic integrity over the service life of the electric feedthrough assembly.

In addition to its high-temperature strength, Inconel® provides superior corrosion resistance in environments containing heated ammonia, hydrogen, nitrogen, and other reactive species associated with ammonia cracking processes. Heated ammonia is known to be highly corrosive to many conventional metals, including certain steels, copper alloys, and silver. Inconel® exhibits strong resistance to chemical attack, oxidation, and scaling under such conditions. This corrosion resistance reduces the likelihood of surface degradation, pitting, or material loss at the sealing interface, which could otherwise compromise sealing effectiveness.

In hydrogen-containing environments, certain materials may experience hydrogen embrittlement or internal decarburization at elevated temperatures. Nickel-based alloys such as Inconel® provide enhanced resistance to hydrogen-induced degradation, thereby improving long-term durability of the beaded gasket 700 when deployed within hydrogen-rich atmospheres generated during ammonia dissociation.

In an embodiment, the use of Inconel® for the beaded gasket 700 further provides material compatibility with other nickel alloy components of the electric feedthrough assembly, including washers 114, counterbore washer 112, threaded nuts 104, and other metallic elements. Similar coefficients of thermal expansion among these nickel-based components reduce differential expansion stresses during thermal cycling. This compatibility assists in maintaining uniform compressive loading across the sealing interfaces and reduces the risk of distortion or stress concentration at elevated temperatures.

Additionally, Inconel® exhibits high fatigue strength and toughness, which enhances resistance to crack initiation and propagation under cyclic loading conditions. In vehicle-mounted applications, where vibration and mechanical shock are present, the mechanical robustness of Inconel® reduces the likelihood of fatigue-related failure of the beaded portion 702.

Accordingly, the beaded gasket configuration of FIG. 7 provides improved sealing performance through increased localized contact stress, controlled elastic compliance, accommodation of thermal expansion differentials, reduction of stress transfer to ceramic components, enhanced resistance to vibration-induced seal degradation, and superior durability in high-temperature, high-pressure, and highly corrosive environments.

Figure 8:
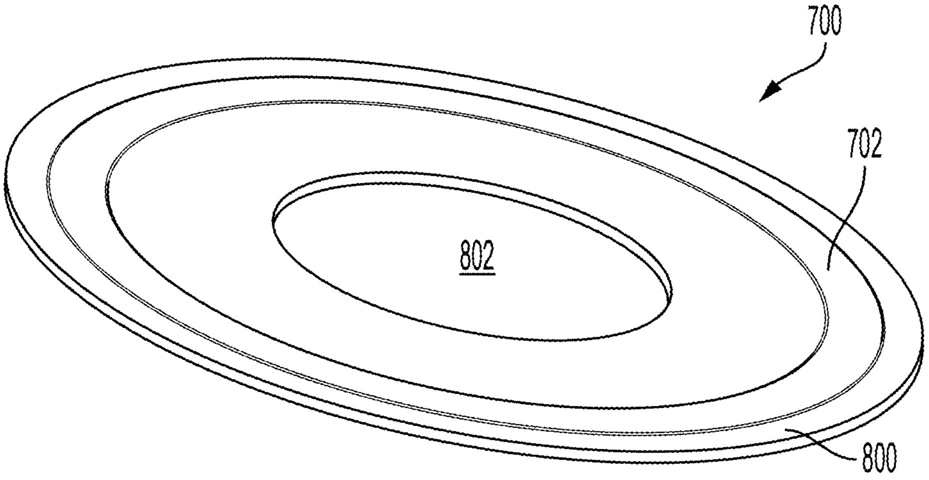
FIG. 8 is a perspective view of a beaded gasket, according to an embodiment of the present invention.

FIG. 8 is a perspective view of a beaded gasket, according to an embodiment of the present invention. The beaded gasket 700 includes a gasket body 800 and at least one circumferentially extending beaded portion 702. The gasket body 800 is generally annular in shape and defines a central aperture 802 configured to receive the pass-thru stud 102 when assembled within the electric feedthrough assembly.

In an embodiment, the gasket body 800 is formed from a metallic material, preferably a nickel-based alloy such as Inconel. The gasket body 800 provides a structural support portion from which the beaded portion 702 projects axially. The beaded portion 702 may extend continuously around the circumference of the gasket body 800, forming a closed circular sealing ridge.

The aperture 802 is dimensioned to concentrically align the beaded gasket 700 relative to the pass-thru stud 102 and adjacent components of the feedthrough assembly. In an embodiment, the radial width of the gasket body 800 between the aperture 802 and the outer perimeter of the gasket is selected to provide sufficient rigidity while permitting controlled deformation of the beaded portion 702 under axial compression.

The beaded portion 702 projects axially from the gasket body 800 and defines a reduced contact area relative to the planar surface of the gasket body 800. Upon compression during assembly, the beaded portion 702 engages adjacent metallic components and deforms to establish a concentrated sealing band. The geometry of the beaded portion 702 permits controlled plastic deformation during initial tightening and elastic response during thermal cycling, thereby assisting in maintaining axial preload and sealing integrity.

In certain embodiments, multiple circumferential beads may be formed in the gasket body 800, or the bead profile may be varied in height or curvature depending on sealing requirements. The gasket body 800 and beaded portion 702 may be formed by stamping, embossing, machining, or other metal-forming processes suitable for high-temperature nickel-based alloys.

Accordingly, FIG. 8 illustrates the structural features of the beaded gasket 700 that enable concentrated sealing, preload retention, and durability in high-temperature, high-pressure, and chemically aggressive environments.

While the principles of the disclosure have been illustrated in relation to the exemplary embodiments shown herein, the principles of the present invention are not limited thereto and include any modification, variation, or permutation thereof.

The invention claimed is:

1. An electric feedthrough for conducting electric currents in a high temperature, high pressure, and corrosive environment, comprising:

a pass-thru stud having a seat between first and second threaded distal ends;

a ceramic washer disposed adjacent a first face of the seat;

a plug disposed on the pass-thru stud, the plug having a threaded portion;

a body threadedly coupled to the threaded portion of the plug; and a first metallic beaded gasket disposed on a first axial side of the ceramic washer and a second metallic beaded gasket disposed on a second axial side of the ceramic washer, wherein each metallic beaded gasket comprises:

an annular metallic body; and a circumferential bead projecting axially from the annular metallic body, wherein the circumferential bead is configured to: (i) plastically deform during initial tightening of the electric feedthrough, and (ii) elastically deflect during subsequent thermal expansion and contraction cycles so as to maintain axial preload and thereby distribute axial load across the ceramic washer.

2. The electric feedthrough of claim 1, wherein the metallic beaded gaskets are formed from a nickel-based superalloy.

3. The electric feedthrough of claim 2, wherein the nickel-based superalloy comprises an alloy containing nickel, chromium, and iron.

4. The electric feedthrough of claim 3, wherein the alloy comprises Inconel.

5. The electric feedthrough of claim 1, wherein the circumferential bead is continuous around an entire circumference of the annular metallic body.

6. The electric feedthrough of claim 1, wherein the circumferential bead defines a reduced axial contact area relative to the annular metallic body to increase localized sealing pressure.

7. The electric feedthrough of claim 1, wherein the circumferential bead forms an integral spring element.

8. The electric feedthrough of claim 1, wherein the metallic beaded gaskets are configured to accommodate differential thermal expansion between the pass-thru stud and the ceramic washer.

9. The electric feedthrough of claim 1, wherein the metallic beaded gaskets form a form a hermetic, gas-tight seal between an interior and exterior of a pressure vessel.

10. The electric feedthrough of claim 9, wherein the pressure vessel contains heated ammonia and hydrogen.

11. A sealing subassembly for isolating a ceramic electrical insulator from compressive stress within a high-temperature feedthrough, comprising:

a ceramic washer;

a first annular metallic gasket disposed on a first axial side of the ceramic washer;

a second annular metallic gasket disposed on a second axial side of the ceramic washer; wherein each annular metallic gasket includes a circumferentially continuous axially projecting bead configured to: (a) concentrate compressive load along a narrow sealing band, and (b) provide elastic compliance during thermal cycling, thereby distributing axial loading across the ceramic washer and reducing fracture risk.

12. The sealing subassembly of claim 11, wherein each annular metallic gasket is formed from Inconel.

13. The sealing subassembly of claim 11, wherein the circumferentially continuous bead is formed by embossing the annular metallic gasket.

14. The sealing subassembly of claim 11, wherein the bead exhibits creep resistance at temperatures above 600° C.

15. The sealing subassembly of claim 11, wherein the bead is configured to dampen vibration-induced micro-movement between adjacent metallic components.

16. A method of maintaining sealing preload in an electric feedthrough exposed to repeated thermal cycling above 600° C., comprising:

positioning a ceramic washer on a pass-thru stud; disposing a first beaded metallic gasket on a first axial side of the ceramic washer;

disposing a second beaded metallic gasket on a second axial side of the ceramic washer; and applying axial compression such that circumferential beads of the beaded metallic gaskets plastically deform to establish a sealing interface and subsequently elastically deflect during thermal expansion and contraction to maintain axial preload.

17. The method of claim 16, wherein the beaded metallic gaskets are formed from a nickel-chromium-iron alloy.

18. The method of claim 17, wherein the alloy comprises Inconel.

19. The method of claim 16, wherein the method is performed in a pressure vessel containing ammonia dissociation products.

20. The method of claim 16, wherein the circumferential beads reduce peak compressive stress applied to the ceramic washer relative to flat metallic washers.

* * * * *